United States Patent
Kitadai

(10) Patent No.: US 12,040,113 B2
(45) Date of Patent: Jul. 16, 2024

(54) FERRITE SINTERED BODY AND WIRE-WOUND COIL COMPONENT

(71) Applicant: Murata Manufacturing Co., Ltd., Kyoto-fu (JP)

(72) Inventor: Yuuki Kitadai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 192 days.

(21) Appl. No.: 17/486,831

(22) Filed: Sep. 27, 2021

(65) Prior Publication Data

US 2022/0108821 A1    Apr. 7, 2022

(30) Foreign Application Priority Data

Oct. 7, 2020   (JP) ................................. 2020-170014

(51) Int. Cl.
*H01F 1/34* (2006.01)
*C04B 35/26* (2006.01)
*H01F 1/08* (2006.01)

(52) U.S. Cl.
CPC ........... *H01F 1/344* (2013.01); *C04B 35/265* (2013.01)

(58) Field of Classification Search
CPC .............. C04B 35/265; C04B 35/2608; C04B 35/2666; C04B 2235/77; H01F 1/344; H01F 1/086; H01F 1/0315; H01F 1/10; H01F 1/342; H01F 1/34; H01F 10/20
See application file for complete search history.

(56) References Cited

U.S. PATENT DOCUMENTS

| | | | |
|---|---|---|---|
| 6,495,059 | B1 | 12/2002 | Aoki et al. |
| 2002/0148995 | A1 | 10/2002 | Yokoyama et al. |
| 2007/0181847 | A1 | 8/2007 | Kuroda et al. |
| 2017/0229221 | A1 | 8/2017 | Okada et al. |
| 2018/0197664 | A1 | 7/2018 | Koizumi et al. |
| 2018/0199474 | A1 | 7/2018 | Okano et al. |
| 2019/0318863 | A1 | 10/2019 | Konishi et al. |
| 2019/0362872 | A1 | 11/2019 | Shibayama et al. |
| 2019/0393605 | A1 | 12/2019 | Nomura et al. |

(Continued)

FOREIGN PATENT DOCUMENTS

| | | |
|---|---|---|
| CN | 111243815 A | 6/2020 |
| JP | S64-45771 A | 2/1989 |

(Continued)

OTHER PUBLICATIONS

Mahcine translation of JP-2008251735-A, 24 pages. (Year: 2008).*

*Primary Examiner* — Matthew E. Hoban
*Assistant Examiner* — Lynne Edmondson
(74) *Attorney, Agent, or Firm* — Studebaker & Brackett PC

(57) ABSTRACT

A ferrite sintered body contains from 48.2% by mole to 49.7% by mole Fe in terms of $Fe_2O_3$, from 2.0% by mole to 8.0% by mole Cu in terms of CuO, from 17.7% by mole to 24.0% by mole Ni in terms of NiO, and from 21.0% by mole to 28.0% by mole Zn in terms of ZnO, in which, when Fe, Cu, Ni, and Zn are converted to $Fe_2O_3$, CuO, NiO, and ZnO, respectively, and when the total amount of the $Fe_2O_3$, the CuO, the NiO, and the ZnO is 100 parts by weight, the ferrite sintered body contains from 5 ppm to 25 ppm B in terms of elemental B and from 6 ppm to 25 ppm Nb in terms of elemental Nb.

8 Claims, 1 Drawing Sheet

(56) References Cited

U.S. PATENT DOCUMENTS

| | | |
|---|---|---|
| 2020/0176157 A1 | 6/2020 | Kitadai |
| 2021/0139377 A1 | 5/2021 | Tanaka et al. |

FOREIGN PATENT DOCUMENTS

| | | | | |
|---|---|---|---|---|
| JP | 2003-100508 A | | 4/2003 | |
| JP | 2003100508 A | * | 4/2003 | ............ H01F 1/344 |
| JP | 2004-323283 A | | 11/2004 | |
| JP | 2005-306668 A | | 11/2005 | |
| JP | 2006-151743 A | | 6/2006 | |
| JP | 2008251735 A | * | 10/2008 | |
| JP | 2012-096961 A | | 5/2012 | |
| JP | 2016-162892 A | | 9/2016 | |
| JP | 2018-125397 A | | 8/2018 | |
| JP | 2020-088266 A | | 6/2020 | |

* cited by examiner

FERRITE SINTERED BODY AND WIRE-WOUND COIL COMPONENT

CROSS-REFERENCE TO RELATED APPLICATION

This application claims benefit of priority to Japanese Patent Application No. 2020-170014, filed Oct. 7, 2020, the entire content of which is incorporated herein by reference.

BACKGROUND

Technical Field

The present disclosure relates to a ferrite sintered body and a wire-wound coil component.

Background Art

Japanese Unexamined Patent Application Publication No. 2018-125397 discloses a wire-wound coil device including a drum core having a winding core portion and flange portions. According to the coil device disclosed in Japanese Unexamined Patent Application Publication No. 2018-125397, a first protruding mounting portion on a flange portion located at an end of a winding core portion and a second protruding mounting portion on a flange portion located at the other end of the winding core portion are arranged in staggered positions; thus, the device has excellent thermal shock resistance.

SUMMARY

Japanese Unexamined Patent Application Publication No. 2018-125397 discloses that the drum core is produced by forming and sintering a ferrite material, such as a Ni—Zn-based ferrite or a Mn—Zn-based ferrite. However, when the ferrite material used for the drum core does not have sufficient heat resistance, the coil device, which is the final product, may have deteriorated thermal shock resistance.

The cross-point frequency, at which the reactance X is equal to the resistance R, is also desired to be high from the viewpoint of efficiently removing high-frequency noise components.

Accordingly, the present disclosure provides a ferrite sintered body having high flexural strength after thermal shock and a high cross-point frequency. Also, the present disclosure provides a wire-wound coil component including the ferrite sintered body as a ceramic core.

According to preferred embodiments of the present disclosure, a ferrite sintered body contains 48.2% or more by mole and 49.7% or less by mole (i.e., from 48.2% by mole to 49.7% by mole) Fe in terms of $Fe_2O_3$, 2.0% or more by mole and 8.0% or less by mole (i.e., from 2.0% by mole to 8.0% by mole) Cu in terms of CuO, 17.7% or more by mole and 24.0% or less by mole (i.e., from 17.7% by mole to 24.0% by mole) Ni in terms of NiO, and 21.0% or more by mole and 28.0% or less by mole (i.e., from 21.0% by mole to 28.0% by mole) Zn in terms of ZnO, in which when Fe, Cu, Ni, and Zn are converted to $Fe_2O_3$, CuO, NiO, and ZnO, respectively, and when the total amount of the $Fe_2O_3$, the CuO, the NiO, and the ZnO is 100 parts by weight, the ferrite sintered body contains 5 ppm or more and 25 ppm or less (i.e., from 5 ppm to 25 ppm) B in terms of elemental B and 6 ppm or more and 25 ppm or less (i.e., from 6 ppm to 25 ppm) Nb in terms of elemental Nb.

According to preferred embodiments of the present disclosure, a wire-wound coil component includes a ceramic core including the ferrite sintered body according to preferred embodiments of the present disclosure, an electrode disposed on an end surface of a flange portion of the ceramic core in a height direction, and a winding disposed around an axial core portion of the ceramic core, the winding having an end portion electrically coupled to the electrode.

Other features, elements, characteristics and advantages of the present disclosure will become more apparent from the following detailed description of preferred embodiments of the present disclosure with reference to the attached drawings.

DETAILED DESCRIPTION

Figure 1:
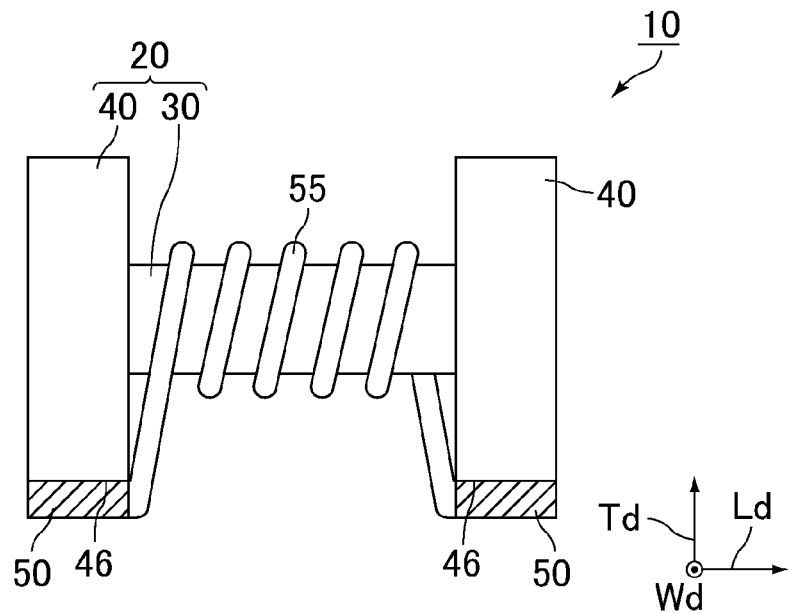
FIG. 1 is a schematic front view of an example of a wire-wound coil component according to an embodiment of the present disclosure.

A ferrite sintered body and a wire-wound coil component according to embodiments of the present disclosure will be described below.

Preferred embodiments of the present disclosure are not limited to configurations described below, but may be modified as appropriate without departing from the scope of the present disclosure. Preferred embodiments of the present disclosure also include a combination of two or more individual preferable configurations according to the present disclosure described below.

Ferrite Sintered Body

The ferrite sintered body according to an embodiment of the present disclosure contains Fe, Cu, Ni, Zn, B, and Nb.

The ferrite sintered body according to an embodiment of the present disclosure contains about 48.2% or more by mole and about 49.7% or less by mole (i.e., from about 48.2% by mole to about 49.7% by mole) Fe in terms of $Fe_2O_3$, about 2.0% or more by mole and about 8.0% or less by mole (i.e., from about 2.0% by mole to about 8.0% by mole) Cu in terms of CuO, about 17.7% or more by mole and about 24.0% or less by mole (i.e., from about 17.7% by mole to about 24.0% by mole) Ni in terms of NiO, and about 21.0% or more by mole and about 28.0% or less by mole (i.e., from about 21.0% by mole to about 28.0% by mole) Zn in terms of ZnO.

When Fe, Cu, Ni, and Zn are converted to $Fe_2O_3$, CuO, NiO, and ZnO, respectively, and when the total amount of the $Fe_2O_3$, the CuO, the NiO, and the ZnO is about 100 parts by weight, the ferrite sintered body according to an embodiment of the present disclosure contains about 5 ppm or more and about 25 ppm or less (i.e., from about 5 ppm to about 25 ppm) B in terms of elemental B and about 6 ppm or more and about 25 ppm or less (i.e., from about 6 ppm to about 25 ppm) Nb in terms of elemental Nb.

The ferrite sintered body according to an embodiment of the present disclosure has a ferrite composition within the above range and thus has high flexural strength after thermal shock and a high cross-point frequency.

The amount of each element contained can be determined by analyzing the composition of the sintered body using inductively coupled plasma-atomic emission spectroscopy/mass spectrometry (ICP-AES/MS).

When the total amount of the $Fe_2O_3$, the CuO, the NiO, and the ZnO is about 100 parts by weight, preferably, the ferrite sintered body according to an embodiment of the present disclosure further contains about 100 ppm or less Mo in terms of elemental Mo. When the ferrite sintered body contains Mo within the above range, the ferrite sintered body can have further increased flexural strength after thermal shock.

In the case where the ferrite sintered body according to an embodiment of the present disclosure contains Mo, the lower limit of the Mo content is not particularly limited. When the total amount of the $Fe_2O_3$, the CuO, the NiO, and the ZnO is about 100 parts by weight, the ferrite sintered body preferably contains about 3 ppm or more Mo in terms of elemental Mo.

In the ferrite sintered body according to an embodiment of the present disclosure, when the total amount of the $Fe_2O_3$, the CuO, the NiO, and the ZnO is about 100 parts by weight, preferably, the ferrite sintered body further contains about 0.5 parts or less by weight Co in terms of $Co_3O_4$ and about 1.0 part or less by weight Sn in terms of $SnO_2$. When the ferrite sintered body contains Co and Sn within the above ranges, the cross-point frequency can be further increased. It is thus possible to provide a noise-absorbing component that can efficiently eliminate high-frequency noise.

In the case where the ferrite sintered body according to an embodiment of the present disclosure contains Co and Sn, the lower limit of the Co content is not particularly limited. When the total amount of the $Fe_2O_3$, the CuO, the NiO, and the ZnO is about 100 parts by weight, the ferrite sintered body preferably contains about 0.0003 parts or more by weight Co in terms of $Co_3O_4$. Additionally, the lower limit of the Sn content is not particularly limited. When the total amount of the $Fe_2O_3$, the CuO, the NiO, and the ZnO is about 100 parts by weight, the ferrite sintered body preferably contains about 0.0003 parts or more by weight Sn in terms of $SnO_2$.

The ferrite sintered body according to an embodiment of the present disclosure is preferably manufactured as described below.

$Fe_2O_3$, CuO, NiO, ZnO, $B_4C$, and $Nb_2O_5$ are weighed in such a manner that the resulting composition after firing is a predetermined composition. These mixing raw materials are placed in a ball mill together with deionized water and partially stabilized zirconia (PSZ) balls, wet-mixed, and pulverized for a predetermined time (for example, about 4 hours or more and about 8 hours or less (i.e., from about 4 hours to about 8 hours)). The resulting mixture is dried by evaporation and then calcined at a predetermined temperature (for example, about 700° C. or higher and about 800° C. or lower (i.e., from about 700° C. to about 800° C.)) for a predetermined time (for example, about 2 hours or more and about 5 hours or less (i.e., from about 2 hours to about 5 hours)) to form a calcined material (calcined powder).

The resulting calcined material (calcined powder) is placed in a ball mill together with deionized water, poly vinyl alcohol serving as a binder, a dispersant, a plasticizer, and PSZ balls, wet-mixed, and pulverized to prepare a slurry. The resulting slurry is dried and granulated with a spray dryer to prepare a granulated powder.

Metal dies are provided. The resulting granulated powder is compacted to form a green compact.

The resulting green compact is fired by holding the green compact in a firing furnace at a predetermined temperature (for example, about 1,100° C. or higher and about 1,200° C. or lower (i.e., from about 1,100° C. to about 1,200° C.)) for a predetermined time (for example, about 2 hours or more and about 5 hours or less (i.e., from about 2 hours to about 5 hours)). The ferrite sintered body is manufactured by the above manufacturing process.

Examples in which a ferrite sintered body according to an embodiment of the present disclosure is more specifically disclosed will be described below. The present embodiment is not limited only to these examples.

Example 1

$Fe_2O_3$, CuO, NiO, ZnO, $B_4C$, and $Nb_2O_5$ were weighed in such a manner that the composition after firing was a composition given in Table 1. These mixing raw materials were placed in a ball mill together with deionized water and PSZ balls, wet-mixed, and pulverized for 4 hours. The resulting mixture is dried by evaporation and then calcined at 800° C. for 2 hours to form a calcined material.

The resulting calcined material was placed in a ball mill together with deionized water, poly vinyl alcohol serving as a binder, a dispersant, a plasticizer, and PSZ balls, mixed, and pulverized to prepare a slurry. The resulting slurry was dried and granulated with a spray dryer to prepare a granulated powder.

The resulting granulated powder was compacted to form green compacts that will be fired to form the following specimens:

single-plate specimens having dimensions of 4 mm×2 mm×1.5 mm, and ring-shaped specimens having an outside diameter of 20 mm, an inside diameter of 12 mm, and a thickness of 1.5 mm.

The resulting green compacts were fired at 1,100° C. for 2 hours. Thereby, samples 1 to 24 were manufactured.

Regarding the single-plate specimens of each of the samples, the amounts of the elements contained were measured by analyzing the compositions of the sintered bodies using ICP-AES/MS. Table 1 presents the results. In Table 1, the values of Fe, Cu, Ni, and Zn are expressed in terms of oxides, and the values of B and Nb are expressed on an elemental basis.

The flexural strength of the single-plate specimens was measured by a three-point flexural test.

The flexural strength of each sample was measured and defined as an initial flexural strength. The specimens were subjected to thermal shock with a temperature difference of 100° C. by immersing the specimens held at 125° C. in 25° C. water. The flexural strength after the thermal shock was measured. Table 1 presents the results.

The flexural strength was the average of the flexural strength values of 10 specimens.

Each of the ring-shaped specimens was placed in a magnetic permeability measurement fixture (16454A-s, available from Agilent Technologies, Inc). The magnetic permeability μ was measured with an impedance analyzer (E4991A, available from Agilent Technologies, Inc.) at 25±2° C. and a measurement frequency of 1 MHz. The frequency characteristics of the reactance X and the resistance R were measured to determine the cross-point frequency at which X is equal to R. Table 1 presents the results.

TABLE 1

| Sample No. | Fe$_2$O$_3$ (mol %) | CuO (mol %) | NiO (mol %) | ZnO (mol %) | B (ppm) | Nb (ppm) | μ (—) | Initial flexural strength (N) | Flexural strength after thermal shock test with temperature difference of 100° C. (N) | Cross-point frequency (MHz) |
|---|---|---|---|---|---|---|---|---|---|---|
| *1  | 49.0 | 0   | 26.0 | 25.0 | 7  | 9  | 371  | 175 | 93  | 15.0 |
| 2   | 49.0 | 2.0 | 24.0 | 25.0 | 7  | 9  | 426  | 183 | 101 | 13.0 |
| 3   | 49.0 | 6.0 | 20.0 | 25.0 | 7  | 9  | 570  | 199 | 135 | 9.6  |
| 4   | 49.0 | 8.0 | 17.7 | 25.3 | 7  | 9  | 589  | 203 | 121 | 9.3  |
| *5  | 49.0 | 10.0| 16.0 | 25.0 | 7  | 9  | 688  | 192 | 96  | 7.9  |
| *6  | 49.0 | 6.0 | 15.0 | 30.0 | 7  | 9  | 1226 | 202 | 138 | 4.3  |
| 7   | 49.0 | 5.0 | 18.0 | 28.0 | 7  | 9  | 754  | 200 | 137 | 7.2  |
| 8   | 49.0 | 6.0 | 24.0 | 21.0 | 7  | 9  | 319  | 198 | 134 | 17.5 |
| *9  | 49.0 | 6.0 | 26.0 | 19.0 | 7  | 9  | 238  | 197 | 134 | 23.8 |
| 10  | 49.7 | 6.0 | 19.3 | 25.0 | 7  | 9  | 604  | 202 | 138 | 9.0  |
| 11  | 48.2 | 6.0 | 20.8 | 25.0 | 7  | 9  | 535  | 196 | 132 | 10.2 |
| *12 | 45.0 | 6.0 | 24.0 | 25.0 | 7  | 9  | 282  | 184 | 112 | 19.9 |
| *13 | 49.0 | 6.0 | 20.0 | 25.0 | 7  | 2  | 590  | 169 | 95  | 9.3  |
| 14  | 49.0 | 6.0 | 20.0 | 25.0 | 7  | 6  | 578  | 179 | 108 | 9.4  |
| 15  | 49.0 | 6.0 | 20.0 | 25.0 | 7  | 15 | 553  | 205 | 143 | 9.9  |
| 16  | 49.0 | 6.0 | 20.0 | 25.0 | 7  | 25 | 525  | 211 | 146 | 10.4 |
| *17 | 49.0 | 6.0 | 20.0 | 25.0 | 7  | 50 | 455  | 160 | 97  | 12.1 |
| *18 | 49.0 | 6.0 | 20.0 | 25.0 | 2  | 9  | 564  | 165 | 95  | 9.7  |
| 19  | 49.0 | 6.0 | 20.0 | 25.0 | 5  | 9  | 567  | 189 | 122 | 9.6  |
| 20  | 49.0 | 6.0 | 20.0 | 25.0 | 15 | 9  | 580  | 209 | 146 | 9.4  |
| 21  | 49.0 | 6.0 | 20.0 | 25.0 | 25 | 9  | 592  | 195 | 150 | 9.2  |
| *22 | 49.0 | 6.0 | 20.0 | 25.0 | 50 | 9  | 554  | 175 | 98  | 11.9 |
| *23 | 49.0 | 6.0 | 20.0 | 25.0 | 2  | 2  | 596  | 167 | 96  | 9.2  |
| *24 | 49.0 | 6.0 | 20.0 | 25.0 | 50 | 50 | 429  | 155 | 81  | 12.9 |

In Table 1, samples marked with asterisks are comparative examples and outside the scope of the present disclosure.

As presented in Table 1, in samples 2 to 4, 7, 8, 10, 11, 14 to 16, and 19 to 21, the ferrite sintered bodies contained 48.2% or more by mole and 49.7% or less by mole (i.e., from 48.2% by mole to 49.7% by mole) Fe in terms of Fe$_2$O$_3$, 2.0% or more by mole and 8.0% or less by mole (i.e., from 2.0% by mole to 8.0% by mole) Cu in terms of CuO, 17.7% or more by mole and 24.0% or less by mole (i.e., from 17.7% by mole to 24.0% by mole) Ni in terms of NiO, and 21.0% or more by mole and 28.0% or less by mole (i.e., from 21.0% by mole to 28.0% by mole) Zn in terms of ZnO and contained 5 ppm or more and 25 ppm or less (i.e., from 5 ppm to 25 ppm) B in terms of elemental B and 6 ppm or more and 25 ppm or less (i.e., from 6 ppm to 25 ppm) Nb in terms of elemental Nb when Fe, Cu, Ni, and Zn were converted to Fe$_2$O$_3$, CuO, NiO, and ZnO, respectively, and when the total amount of the Fe$_2$O$_3$, the CuO, the NiO, and the ZnO was 100 parts by weight. In these samples, each of the ferrite sintered bodies had a magnetic permeability p of 290 or more, a flexural strength of 100 N or more after the thermal shock with a temperature difference of 100° C., and a cross-point frequency of 5 MHz or more.

Example 2

MoO$_3$ was added to the composition of sample 3 in Table 1 in an amount of 3 ppm, 30 ppm, 50 ppm, or 100 ppm in terms of elemental Mo. The same evaluation as in Example 1 was performed. A method for measuring the Mo content was the same as in Example 1. Table 2 presents the results.

TABLE 2

| Sample No. | Mo (ppm) | μ (–) | Initial flexural strength (N) | Flexural strength after thermal shock test with temperature difference of 100° C. (N) | Cross-point frequency (MHz) |
|---|---|---|---|---|---|
| 3  | 0   | 570 | 199 | 135 | 10 |
| 31 | 3   | 571 | 199 | 137 | 10 |
| 32 | 30  | 573 | 201 | 143 | 10 |
| 33 | 50  | 575 | 217 | 153 | 10 |
| 34 | 100 | 580 | 211 | 158 | 9  |

As presented in Table 2, samples 31, 32, 33, and 34 each containing 100 ppm or less Mo in terms of elemental Mo had further increased flexural strength after the thermal shock with a temperature difference of 100° C.

Example 3

Co and Sn were added to the compositions of sample 3 in Table 1 and sample 32 in Table 2 in the amounts given in Table 3 in terms of Co$_3$O$_4$ and SnO$_2$. The same evaluation as in Example 1 was performed. A method for measuring the Co content and the Sn content was the same as in Example 1. Table 3 presents the results.

TABLE 3

| Sample No. | Mo (ppm) | Co₃O₄ (parts by weight) | SnO₂ (parts by weight) | μ (—) | Initial flexural strength (N) | Flexural strength after thermal shock test with temperature difference of 100° C. (N) | Cross-point frequency (MHz) |
| --- | --- | --- | --- | --- | --- | --- | --- |
| 3 | 0 | 0 | 0 | 570 | 199 | 135 | 10 |
| 41 | 0 | 0.2 | 0.4 | 364 | 206 | 145 | 15 |
| 42 | 0 | 0.5 | 1.0 | 293 | 197 | 166 | 20 |
| 32 | 30 | 0 | 0 | 573 | 201 | 143 | 10 |
| 43 | 30 | 0.2 | 0.4 | 360 | 208 | 153 | 15 |
| 44 | 30 | 0.5 | 1.0 | 290 | 199 | 151 | 19 |

As presented in Table 3, samples 41, 42, 43, and 44 each containing 0.5 parts or less by weight Co in terms of $Co_3O_4$ and 1.0 part or less by weight Sn in terms of $SnO_2$ had higher cross-point frequencies.

Wire-Wound Coil Component

A wire-wound coil component according to an embodiment of the present disclosure includes a ferrite sintered body according to an embodiment of the present disclosure as a ceramic core. As described above, the ferrite sintered body according to an embodiment of the present disclosure has high flexural strength even when subjected to thermal shock and thus can be suitably used for a wire-wound coil component used in high-temperature environments, such as in automotive applications.

Figure 2:
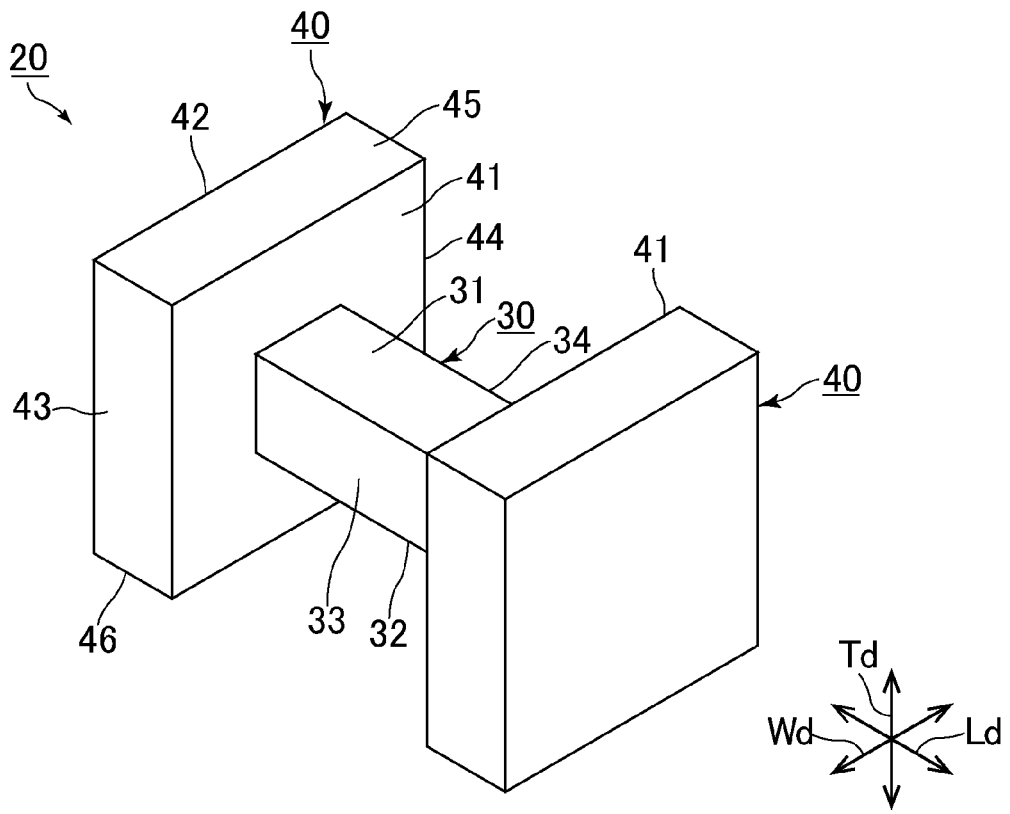
FIG. 2 is a schematic perspective view of an example of a ceramic core included in the wire-wound coil component illustrated in FIG. 1.

FIG. 1 is a schematic front view of an example of a wire-wound coil component according to an embodiment of the present disclosure. FIG. 2 is a schematic perspective view of an example of a ceramic core included in the wire-wound coil component illustrated in FIG. 1.

FIGS. 1 and 2 are schematic views, and the dimensions, the aspect ratios, and so forth may not be drawn to scale.

A wire-wound coil component 10 illustrated in FIG. 1 includes a ceramic core 20, electrodes 50, and a winding (coil) 55. The ceramic core 20 is formed of a ferrite sintered body according to an embodiment of the present disclosure.

As illustrated in FIG. 2, the ceramic core 20 includes an axial core portion 30 and a pair of flange portions 40 disposed at both end portions of the axial core portion 30. The axial core portion 30 and the flange portions 40 are formed in one piece.

In this specification, as illustrated in FIGS. 1 and 2, the direction in which the pair of the flange portions 40 are arranged side by side is defined as a longitudinal direction Ld. Of the directions perpendicular to the longitudinal direction Ld, the vertical direction in FIGS. 1 and 2 is defined as a height direction (thickness direction) Td, and the direction perpendicular to both the longitudinal direction Ld and the height direction Td is defined as a width direction Wd.

The axial core portion 30 has, for example, a substantially rectangular parallelepiped shape extending in the longitudinal direction Ld. The central axis of the axial core portion 30 extends substantially parallel to the longitudinal direction Ld. The axial core portion 30 has a pair of main surfaces 31 and 32 opposite each other in the height direction Td and a pair of side surfaces 33 and 34 opposite each other in the width direction Wd.

In this specification, the term "rectangular parallelepiped shape" includes a substantially rectangular parallelepiped with chamfered corners and edges, and a substantially rectangular parallelepiped with rounded corners and edges. Irregularities may be present in the whole or part of each of the main surfaces and the side surfaces.

The pair of the flange portions 40 are provided at both end portions of the axial core portion 30 in the longitudinal direction LA. Each of the flange portions 40 has a substantially rectangular parallelepiped shape with a relatively small dimension in the longitudinal direction Ld. Each flange portion 40 extends around the axial core portion 30 in the height direction Td and the width direction Wd. Specifically, when viewed in the longitudinal direction Ld, each flange portion 40 has a planar shape extending from the axial core portion 30 in the height direction Td and the width direction Wd.

Each of the flange portions 40 has a pair of main surfaces 41 and 42 opposite each other in the longitudinal direction Ld, a pair of side surfaces 43 and 44 opposite each other in the width direction Wd, and a pair of end surfaces 45 and 46 opposite each other in the height direction Td. The main surface 41 of one of the flange portions 40 faces the main surface 41 of the other flange portion 40.

For example, the entire main surface 41 of each of the flange portions 40 extends substantially perpendicular to the direction in which the central axis of the axial core portion 30 extends (that is, the longitudinal direction Ld). In other words, the entire main surface 41 of each flange portion 40 extends substantially parallel to the height direction Td. However, the main surface 41 of each flange portion 40 may have an inclination.

As illustrated in FIG. 1, the electrodes 50 are disposed on the end surfaces 46 of the respective flange portions 40 in the height direction Td. The electrodes 50 are electrically coupled to electrodes of a circuit board when the wire-wound coil component 10 is mounted on the circuit board. The electrodes 50 are composed of, for example, a nickel-based alloy such as nickel (Ni)-chromium (Cr) or Ni-copper (Cu), silver (Ag), Cu, or tin (Sn).

The winding 55 is disposed around the axial core portion 30. The winding 55 has a structure in which a core wire mainly composed of a conductive material such as Cu is covered with an insulating material such as polyurethane or polyester. Both end portions of the winding 55 are electrically coupled to the respective electrodes 50.

The wire-wound coil component according to an embodiment of the present disclosure is manufactured as described below.

As described in "Ferrite Sintered Body" above, a granulated powder is compacted to form a green compact. The green compact is fired by holding the green compact in a firing furnace at a predetermined temperature (for example, about 1,100° C. or higher and about 1,200° C. or less (i.e., from about 1,100° C. to about 1,200° C.)) for a predetermined time (for example, about 2 hours or more and about 5 hours or less (i.e., from about 2 hours to about 5 hours)). The resulting sintered body is placed in a barrel and polished with an abrasive. The above manufacturing process results in a ceramic core as illustrated in FIG. 2.

Subsequently, an electrode is formed on an end surface of each of the flange portions of the ceramic core. For example, a conductive paste containing Ag and glass frit is applied to the end surface of each flange portion and subjected to baking treatment under predetermined conditions (for example, about 800° C. or higher and about 820° C. or lower (i.e., from about 800° C. to about 820° C.)) to form an underlying metal layer. Then a Ni plating film and a Sn plating film are sequentially formed on the underlying metal layer by electrolytic plating to form the electrode.

A winding is formed around the axial core portion of the ceramic core. Then end portions of the winding are joined to the electrodes by a known method such as thermocompression bonding. The wire-wound coil component as illustrated in FIG. 1 can be manufactured through the above process.

A wire-wound coil component according to an embodiment of the present disclosure is not limited only to the foregoing embodiments, and various applications and changes can be made within the scope of the present disclosure.

In a wire-wound coil component according to an embodiment of the present disclosure, the shape and size of the axial core portion of the ceramic core, the shape and size of the flange portions of the ceramic core, the thickness of the winding (wire diameter), the number of turns, the cross-sectional shape, and the number of windings are not particularly limited and can be appropriately changed in accordance with the desired characteristics and mounting location. The positions and number of electrodes can also be appropriately set in accordance with the number of windings and the application.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A ferrite sintered body, comprising:
   from 48.2% by mole to 49.7% by mole Fe in terms of $Fe_2O_3$;
   from 2.0% by mole to 8.0% by mole Cu in terms of CuO;
   from 17.7% by mole to 24.0% by mole Ni in terms of NiO; and
   from 21.0% by mole to 28.0% by mole Zn in terms of ZnO,
   wherein when Fe, Cu, Ni, and Zn are converted to $Fe_2O_3$, CuO, NiO, and ZnO, respectively, and when a total amount of the $Fe_2O_3$, the CuO, the NiO, and the ZnO is 100 parts by weight, the ferrite sintered body comprises from 5 ppm to 25 ppm B in terms of elemental B and from 6 ppm to 25 ppm Nb in terms of elemental Nb.

2. The ferrite sintered body according to claim 1, wherein when the total amount of the $Fe_2O_3$, the CuO, the NiO, and the ZnO is 100 parts by weight, the ferrite sintered body further comprises 100 ppm or less Mo in terms of elemental Mo.

3. The ferrite sintered body according to claim 1, wherein when the total amount of the $Fe_2O_3$, the CuO, the NiO, and the ZnO is 100 parts by weight, the ferrite sintered body further comprises 0.5 parts or less by weight Co in terms of $Co_3O_4$ and 1.0 part or less by weight Sn in terms of $SnO_2$.

4. A wire-wound coil component, comprising:
   a ceramic core including the ferrite sintered body according to claim 1;
   an electrode disposed on an end surface of a flange portion of the ceramic core in a height direction; and
   a winding disposed around an axial core portion of the ceramic core, the winding having an end portion electrically coupled to the electrode.

5. The ferrite sintered body according to claim 2, wherein when the total amount of the $Fe_2O_3$, the CuO, the NiO, and the ZnO is 100 parts by weight, the ferrite sintered body further comprises 0.5 parts or less by weight Co in terms of $Co_3O_4$ and 1.0 part or less by weight Sn in terms of $SnO_2$.

6. A wire-wound coil component, comprising:
   a ceramic core including the ferrite sintered body according to claim 2;
   an electrode disposed on an end surface of a flange portion of the ceramic core in a height direction; and
   a winding disposed around an axial core portion of the ceramic core, the winding having an end portion electrically coupled to the electrode.

7. A wire-wound coil component, comprising:
   a ceramic core including the ferrite sintered body according to claim 3;
   an electrode disposed on an end surface of a flange portion of the ceramic core in a height direction; and
   a winding disposed around an axial core portion of the ceramic core, the winding having an end portion electrically coupled to the electrode.

8. A wire-wound coil component, comprising:
   a ceramic core including the ferrite sintered body according to claim 5;
   an electrode disposed on an end surface of a flange portion of the ceramic core in a height direction; and
   a winding disposed around an axial core portion of the ceramic core, the winding having an end portion electrically coupled to the electrode.

* * * * *